US008810806B2

(12) United States Patent
Barbier et al.

(10) Patent No.: US 8,810,806 B2
(45) Date of Patent: Aug. 19, 2014

(54) OPTICAL SYSTEM FOR MEASURING ORIENTATION AND POSITION WITHOUT IMAGE FORMATION WITH POINT SOURCE AND MASK

(71) Applicant: Thales, Neuilly sur Seine (FR)

(72) Inventors: Bruno Barbier, Bordeaux (FR); Laurent Potin, Coutras (FR); Siegfried Rouzes, Le Haillan (FR)

(73) Assignee: Thales, Nueilly sur Seine (FR)

( * ) Notice: Subject to any disclaimer, the term of this patent is extended or adjusted under 35 U.S.C. 154(b) by 0 days.

(21) Appl. No.: 13/941,421

(22) Filed: Jul. 12, 2013

(65) Prior Publication Data
US 2014/0016138 A1    Jan. 16, 2014

(30) Foreign Application Priority Data

Jul. 13, 2012  (FR) ...................... 12 01999

(51) Int. Cl.
 *G01B 11/14*        (2006.01)
(52) U.S. Cl.
 CPC ...................... *G01B 11/14* (2013.01)
 USPC ...................... 356/614; 356/139.03; 356/4.01
(58) Field of Classification Search
 CPC ...................... G01B 11/14
 USPC .................. 356/614, 4.01, 5.11, 138–139.03;
                       345/156, 158, 419, 633
 See application file for complete search history.

(56) References Cited

U.S. PATENT DOCUMENTS

| | | | |
|---|---|---|---|
| 4,193,689 A * | 3/1980 | Reymond et al. | 356/139.03 |
| 4,672,562 A * | 6/1987 | Egli et al. | 702/153 |
| 4,792,697 A * | 12/1988 | Le Parquier et al. | 250/559.3 |
| 4,896,962 A * | 1/1990 | Menn et al. | 356/139.03 |
| 4,897,715 A * | 1/1990 | Beamon, III | 348/115 |
| 5,128,794 A * | 7/1992 | Mocker et al. | 359/196.1 |
| 5,207,003 A | 5/1993 | Yamada et al. | |

(Continued)

FOREIGN PATENT DOCUMENTS

| | | |
|---|---|---|
| FR | 2 936 607 A1 | 4/2010 |
| GB | 2 082 867 A | 3/1982 |
| WO | WO 2011/067341 A1 | 6/2011 |

OTHER PUBLICATIONS

French Search Report for Counterpart French Patent Application No. 1201999, 8 pgs. (Mar. 14, 2013).

*Primary Examiner* — Sang Nguyen
(74) *Attorney, Agent, or Firm* — Blakely, Sokoloff, Taylor & Zafman LLP

(57) ABSTRACT

The general field of the invention is that of systems for the optical detection of the orientation and the position of a mobile object in space. The system comprises a fixed electro-optical device comprising a transmission point source, image analysis means and an optical cube corner disposed on the mobile object. The input surface of the cube corner comprises a polygonal-shaped mask, the sides of which comprise a geometric marking to identify them. The fixed electro-optical device comprises photosensitive means close to the point source and disposed in two different recording planes and recording two luminous shapes in perspective of the mask obtained by reflection on the surfaces of the cube corner. The image analysis means comprise means for determining the vanishing points of the two luminous shapes in the two recording planes, the knowledge of the four vanishing points enabling the determination of the position and orientation of the optical cube corner in relation to the fixed electro-optical device.

10 Claims, 8 Drawing Sheets

(56) References Cited

U.S. PATENT DOCUMENTS

| | | | |
|---|---|---|---|
| 5,521,843 A * | 5/1996 | Hashima et al. | 700/253 |
| 5,645,525 A * | 7/1997 | Krivosha | 602/62 |
| 5,767,524 A * | 6/1998 | Barbier et al. | 250/559.29 |
| 6,300,974 B1 * | 10/2001 | Viala et al. | 348/61 |
| 6,400,139 B1 * | 6/2002 | Khalfin et al. | 324/207.17 |
| 2006/0165312 A1 * | 7/2006 | Odell | 382/291 |
| 2011/0079703 A1 * | 4/2011 | Gunning et al. | 250/206.2 |

* cited by examiner

OPTICAL SYSTEM FOR MEASURING ORIENTATION AND POSITION WITHOUT IMAGE FORMATION WITH POINT SOURCE AND MASK

BACKGROUND OF THE INVENTION

1. Field Of The Invention

The field of the invention is that of optical devices for measuring the orientation of an object in space without contact. Various fields of possible applications exist, but the main application is the detection of the orientation and the position of an aircraft pilot's helmet, thus enabling an image to be projected in his visor in exact superposition onto the external landscape, or to lock different systems of the apparatus onto his gaze. The desired precision in such systems is in the order of the milliradian.

2. Description of the Prior Art

Different optical techniques exist for measuring the orientation on the helmet. Generally, distinctive elements which are located by a system of cameras are installed on the helmet. The position of the images of these distinctive elements allows the orientation of the helmet to be determined through calculation.

These elements may be passive or active. The passive elements are illuminated by an external source. Retroreflective cube corners or retroreflectors can be used for this purpose. It suffices to dispose the optical transmitting and receiving components on the same axis.

These retroreflector systems are insensitive to solar illumination, but are combined with one of the following types of fixed devices:

a camera which supplies an image, the quality of which degrades during movements of the helmet;

a combined lens for illumination and image capture which provides a wide depth of field but of which the size is significant.

Moreover, in these two types of system, the limited angular field of the fixed device in the cabin reduces the range of possible positions of the helmet and the position measurement requires the presence of at least three reflectors on the helmet, thus adversely affecting the compactness of the system.

SUMMARY OF THE INVENTION

The present invention overcomes these disadvantages. In the orientation and position detection system according to the invention, the optical transmitter/receiver unit is reduced to a simple point source associated with an array sensor which, without an optical lens, makes up a compact catoptric measuring system using a single reflector on the helmet. This disposition offers the following advantages:

the fixed device and the mobile device are compact, offering a decisive advantage for helmet position detection systems;

the range of positions of the object Is wide, since it is not limited by the angular field of an optical lens;

the contours of the luminous shape collected on the sensor are clearly defined for all positions of the object;

the calculation simultaneously supplies the orientation and position of the mobile object;

the number of components on the mobile object is limited to a single corner-cube retroreflector associated with a mask with a specific contour. The illumination is provided by a single white point source;

Two different luminous shapes of the retroreflected pupil contour are collected without a lens on a fixed colour array sensor;

The analysis of the two luminous shapes obtained by central projection simultaneously provides the orientation and position of the helmet.

More precisely, the subject-matter of the invention is a system for detecting the orientation and the position of a mobile object in space, comprising a fixed electro-optical device of known orientation comprising at least a first transmission point source, image analysis means and a unit comprising an optical cube corner disposed on the mobile object, characterised in that:

the input surface of the cube corner comprises a polygonal-shaped mask, each side of the polygon comprising a geometric marking to identify it, the image of the mask obtained by reflection on the surfaces of the cube corner being the intersection of the projection of the mask and the projection of its image by the cube corner in relation to the centre of the cube corner;

the fixed electro-optical device comprises optical means for implementing a first luminous shape in perspective in a first recording plane and a second luminous shape in perspective in a second recording plane optically offset from the first recording plane, photosensitive means being disposed in said recording planes, and;

the image analysis means comprise means for determining the two first vanishing points of the first luminous shape in the first recording plane and the two second vanishing points of the second luminous shape in the second recording plane, the knowledge of said four vanishing points enabling the determination of the position and orientation of the optical cube corner in relation to the fixed electro-optical device.

The fixed electro-optical device advantageously comprises only optical components having a zero or quasi-zero optical power, i.e. plane mirrors or semi-reflective planar blades, the separation between the transmission point source and the first and second image being carried out by means of a semi-reflective planar blade.

The first recording plane is advantageously parallel with the second recording plane and offset by a predetermined distance where the first recording plane is tilted in relation to the second recording plane at a predetermined angle.

In a first alternative embodiment, the first recording plane is separated from the second recording plane by means of a spectrally neutral semi-reflective blade, the photosensitive means being two different array sensors.

In a second alternative embodiment, the first recording plane is separated from the second recording plane by means of a unit comprising a first dichroic blade and a mirror disposed in such a way as to reflect two different spectral bands, the photosensitive means being one and the same array sensor, the transmission point source transmitting in the two spectral bands.

The fixed electro-optical device advantageously comprises an array of transmission point sources, said sources being illuminated according to the position of the mobile object.

The input surface of the cube corner advantageously comprises a parallelogram-shaped mask.

The fixed electro-optical device advantageously comprises an input diaphragm, the transmission point source or its image being disposed in the vicinity of this diaphragm, the photosensitive means being set back from this diaphragm in such a way as to limit external parasitic illumination.

The invention also relates to a pilot's helmet comprising an optical cube corner, the input surface of which comprises a parallelogram-shaped mask, each side of the parallelogram comprising a geometric marking to identify said cube corner intended to operate in a system for detecting the position of a mobile object as defined above.

BRIEF DESCRIPTION OF THE DRAWINGS

The invention will be more readily understood and other advantages will become evident from reading the non-limiting description which follows, referring also to the attached drawings, in which.

DETAILED DESCRIPTION

The system for detecting the position of a mobile object in space according to the invention comprises:
a unit comprising an optical cube corner disposed on the mobile object and comprising a mask on its input surface;
a fixed electro-optical device of known orientation comprising at least a first transmission point source and reception means disposed in two predetermined planes;
image analysis and position and orientation calculation means.

The principle of the measurement of the orientation and position of the mobile object is explained below.

Figure 1:
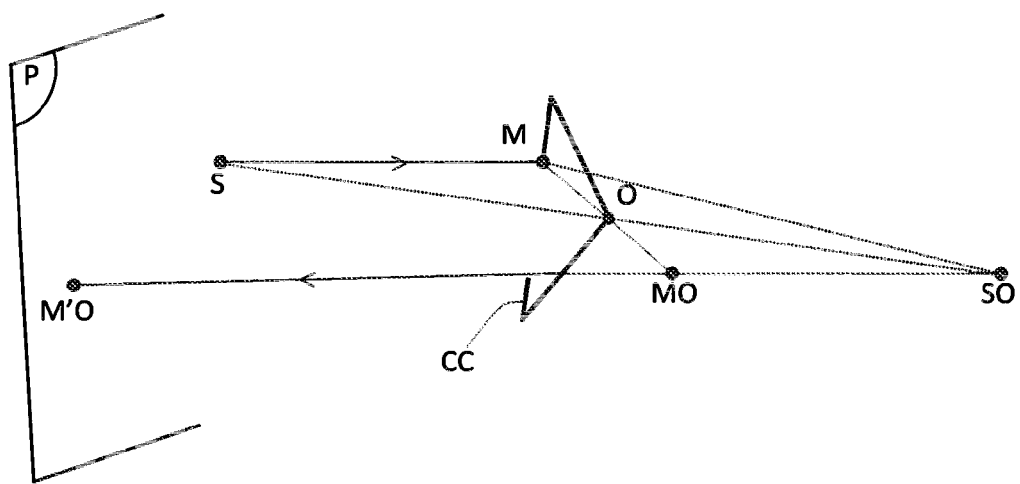
FIG. 1 shows the image of a point M of the input surface of a cube corner given by a point source S in a predetermined plane P.

The image of a point M of the mask of the cube corner CC given by the point source S is shown in FIG. 1. A fixed point source S illuminates the cube corner reflector CC which has a peak O. The image of S by the reflector is the point S0, symmetrical with S in relation to O. The source S may, for example, be a laser diode or an electroluminescent diode associated if necessary with an optical device increasing the divergence of the luminous flux. It is fundamental that this source is a point source or quasi-point source.

Figure 2:
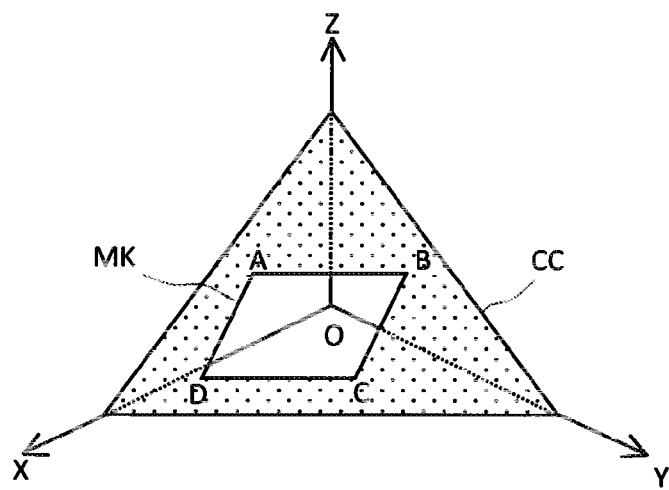
FIG. 2 shows a view of the cube corner and its mask.
Figure 3:
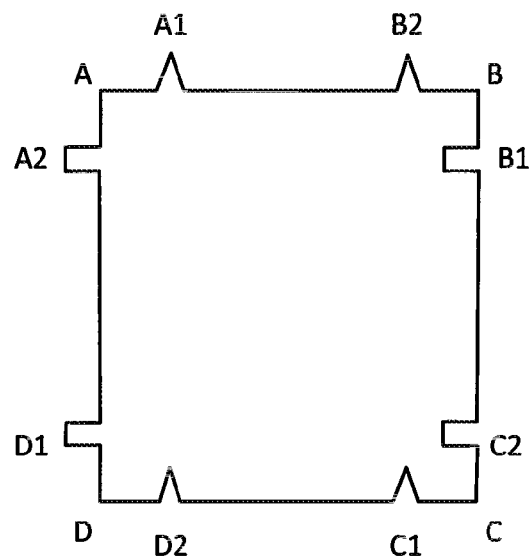
FIG. 3 shows a view of a parallelogram-shaped mask and its identification markings.

As shown in FIG. 2, the linked mask MK is positioned in front of the triangular front surface of the cube corner reflector CC. The latter is referenced by an indicator OXYZ. The perpendicular to the front surface is, for example, the diagonal of the cube of peaks carried by OX, OY, OZ. This mask is, for example, a parallelogram ABCD and its sides are differentiated from one another by different techniques. As a non-limiting example shown in FIG. 3, the sides can be differentiated by notches positioned near the peaks. These notches are of two different shapes: triangular or crenellated. They are also formed as projections or indentations. As shown in FIG. 3, each of the peaks A, B, C and D comprises two notches A1 and A2, B1 and B2, C1 and C2, D1 and D2 the disposition of which differs for each peak.

The reflected image of any point M of the contour of the mask by the cube corner is produced by the virtual source S0. This image is on the reflected beam S0M0, passing by the symmetrical image MO of M in relation to O. As S0 is a point source, this image can be produced without an image-forming lens. It is implemented at the point M'0 on the plane P and is sharp regardless of the position and orientation of this plane P. The angular acceptance of the cube corner CC being limited, the image is observable only close to the axis S-SO.

Figure 4:
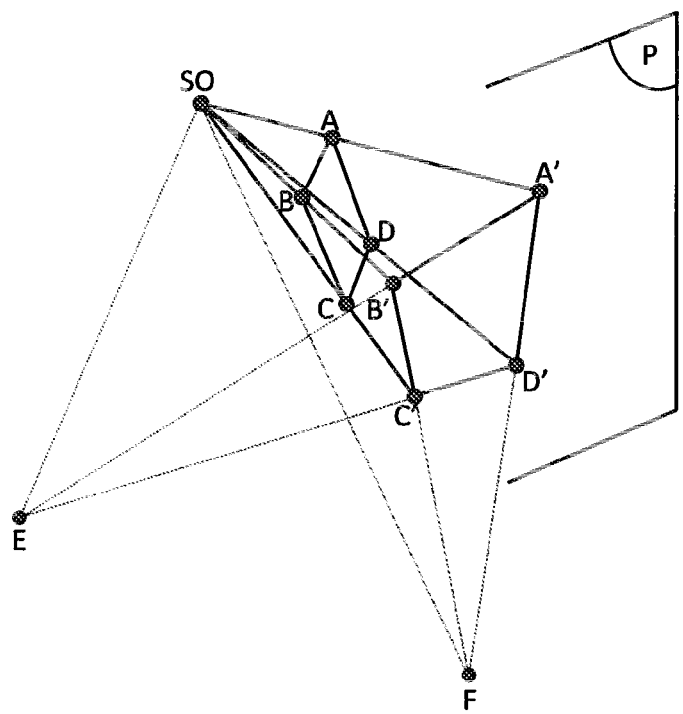
FIG. 4 shows the image of a parallelogram given by central projection of centre S onto a predetermined plane P and of the two vanishing points of this image.

FIG. 4 shows the geometric projection of the parallelogram ABCD onto the plane P. This projection is a quadrilateral A'B'C'D'. Its sides A'B' and C'D', projections of the two parallel straight lines AB and CD, are concurrent at the vanishing point E, defined by the intersection with the plane P of the straight line parallel with AB and with CD drawn from S0. Similarly, the sides A'D' and B'C' are concurrent at the vanishing point F, defined by the intersection with the plane P of the straight line parallel with AD and with BC drawn from S0.

The image in real perspective of the mask ABCD on the plane P is a luminous quadrilateral made up in the following manner and shown in FIG. 5. The contour ABCD of the mask and its virtual image A0B0C0D0 by the reflector are symmetrical in relation to O, their sides therefore being parallel. This image is not shown in FIG. 5. The geometric projection not shown of the parallelogram A0B0C0D0 on P is a quadrilateral A'0B'0C'0D'0 with the same vanishing points E and F as the quadrilateral A'B'C'D'. The two projected quadrilaterals have a common surface which is the quadrilateral A'RA'0T shown by bold lines in FIG. 5, the contour of which is made up, in the example shown in FIG. 5, of all or part of each of the sides A'B' and A'D' of the projection of the contour ABCD of the mask. This luminous surface A'RA'0T corresponds to the only directions generating a reflected luminous flux. It corresponds to the light beams originating from the real source S which have been filtered by the diaphragm ABCD, reflected by the reflector with the peak O then filtered by the contour A0B0C0D0, symmetrical with the contour ABCD and finally projected onto the plane P.

Figure 5:
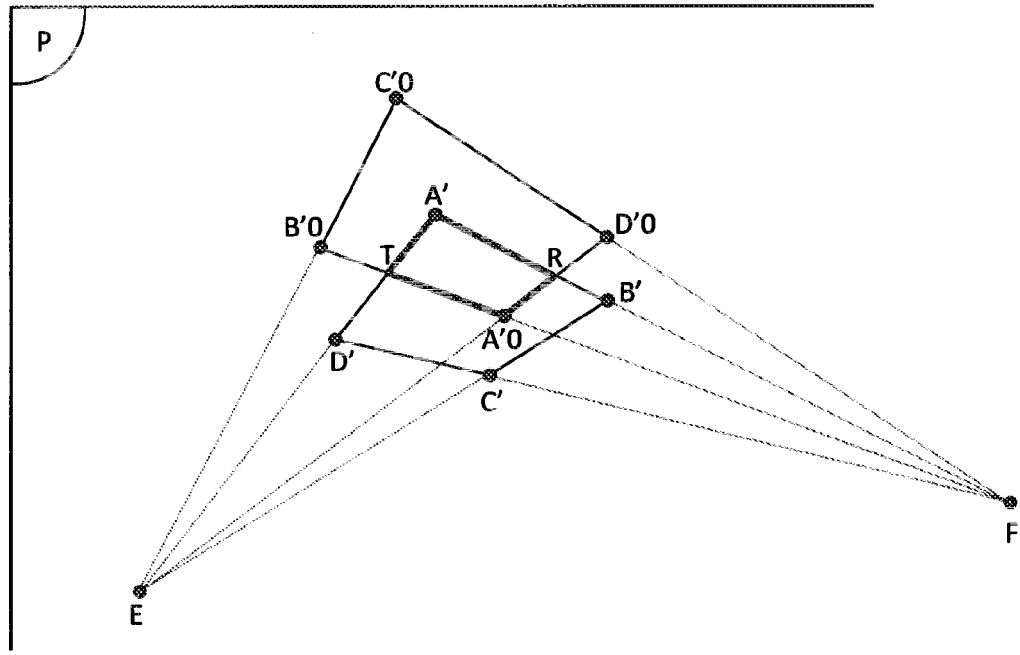
FIG. 5 shows the image of a parallelogram-shaped mask given by central projection of centre S onto a predetermined plane P and of the two vanishing points of this image.

The points of concurrence of the sides of the common quadrilateral, taken two by two, are of course the two vanishing points E and F shown in FIG. 5.

Figure 6:
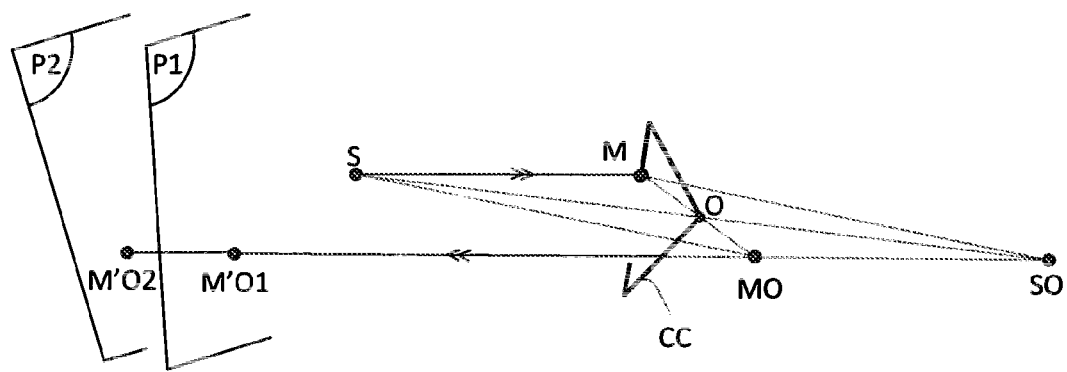
FIG. 6 shows the image of a point M of the input surface of a cube corner given by a point source S in two predetermined planes.

In implementing the projection in two different planes P1 and P2 of known position and orientation as shown in FIG. 6, each point M of the mask gives two image points M'01 and M'02. Thus, in each plane, two vanishing points exist, denoted E1, F1 and E2, F2 respectively. The knowledge of these four vanishing points enables the required information to be found. The required directions, i.e. those of the sides AB and BC of the mask are given by those of the straight lines E1E2 and F1F2. The device also supplies the position of the mobile object, in fact, the position of the virtual source S0 is given by the intersection of the two straight lines E2E1 and F2F1, and that of the centre O of the cube corner is given by the environment of the segment SS0.

In all of the preceding description, the mask is parallelogram-shaped. The measurement method applies to any polygonal mask contour, provided that it is possible to Identify, on the projected luminous shape, the side of the mask to which each side of the projected luminous polygon corresponds.

Figure 7:
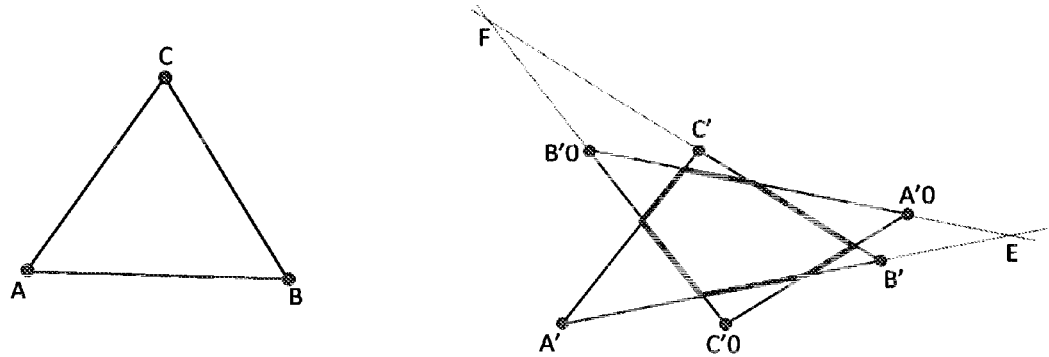
FIG. 7 shows a view of a triangular-shaped mask and its image obtained by reflection in the cube corner.

For example, for a triangular mask ABC as shown in the left part of FIG. 7, the contour of which matches the input surface of the reflector, a hexagonal figure is obtained on a projection plane P shown in the right part of FIG. 7, verifying the following properties:

the projected sides A'B' and A'0B'0, respective projections of two parallel sides AB and A0B0, image of AB obtained by reflection in the cube corner, are concurrent in E;

the projected sides C'B' and C'0B'0, respective projections of two parallel sides CB and C0B0, image of C-B obtained by reflection in the cube corner, are concurrent in F;

the luminous surface shown by a contour in bold lines in FIG. 7 is a hexagon which does not contain any of the vertices of the projected triangles A'B'C' and A'0B'0C'0.

Figure 8:
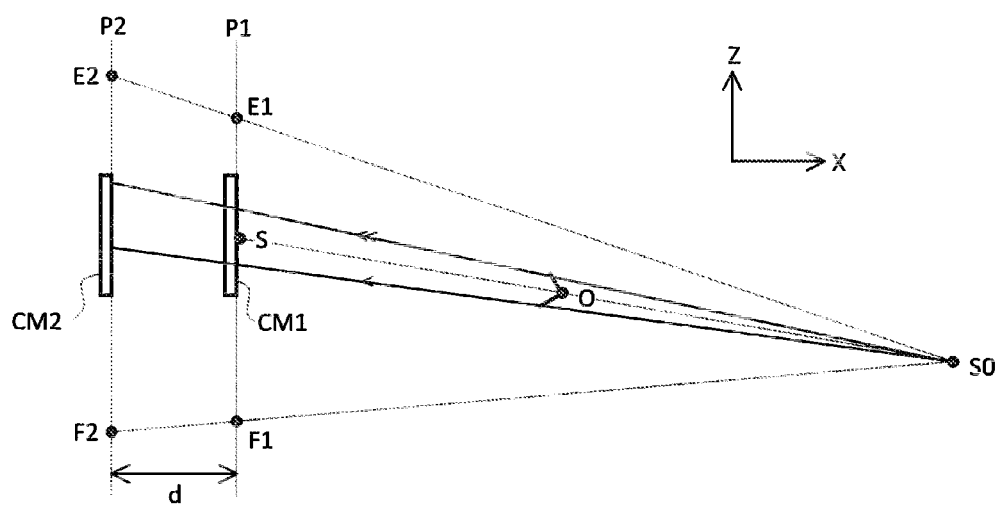
FIG. 8 shows the different vanishing points in two predetermined parallel planes.
Figure 9:
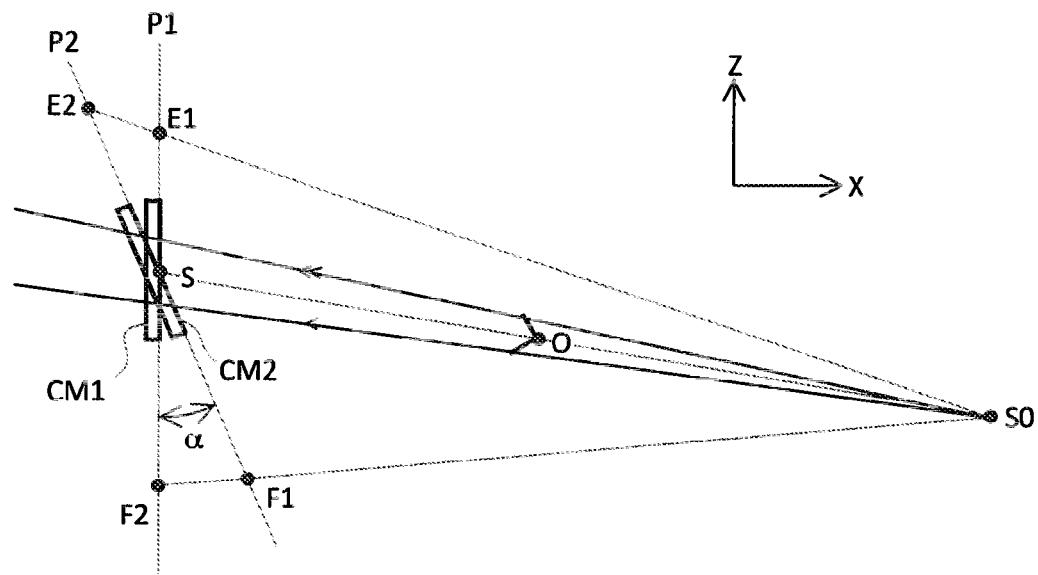
FIG. 9 shows the different vanishing points in two predetermined planes forming an angle between one another.

The positions of the vanishing points E1, F1 on P1 and E2, F2 on P2 are measured, for example, using two image array sensors and denoted CM1 and CM2 in FIGS. 8 to 15. FIGS. 8 to 15 are shown in a cross-sectional plane (X, Z). These sensors are really or virtually positioned by means of mirrors or semi-reflective blades on the two planes P1 and P2 which are, for example:

either parallel and separated by a known distance d as shown in FIG. 8;

or concurrent and pivoted in relation to one another at a known angle α as shown in FIG. 9.

The vanishing points E and F are generally outside the field of the array sensors CM, but their positions are given by the orientation of the sides of the quadrilateral imaged on each detector.

Positioning the centre of a detector close to the source S or its image produced by a deflecting mirror minimises its size while allowing a wide range of positions for the vertex O of the reflector and therefore of the mobile object. In fact, in principle, regardless of the position of the vertex O, the luminous quadrilateral collected on the plane P1 which contains the source S, as shown in FIGS. 8 and 9:

remains more or less centred on the source S;

retains a dimension equal to roughly double the dimension of the mask ABCD of the cube corner.

FIGS. 10 to 15 show the simplified physical embodiments of the fixed electro-optical device DEO according to the invention. This device comprises a transmission point source S and array sensor photoreception means. The different figures are implemented in a cross-sectional plane (X, Z). As shown in the preceding figures, the fixed electro-optical device must comprise two array sensors located In two parallel or non-parallel planes. Similarly, it is important that the point source is disposed in the vicinity of the centre(s) of the detectors. These configurations are obtained by means of mirrors and semi-reflective blades denoted m and m' in FIGS. 10 to 15. The points S'1 and S'2 are the images of S obtained by reflection onto these blades.

Figure 10:
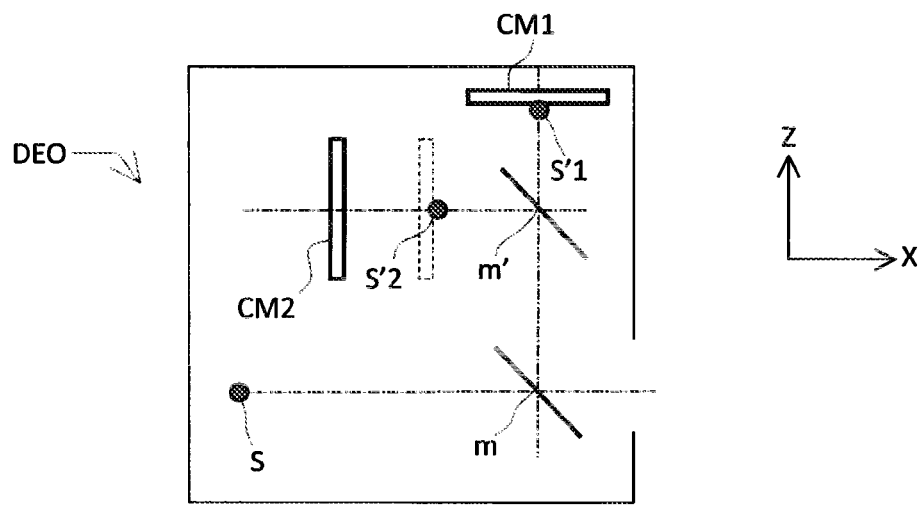
FIG. 10 shows a first embodiment of a fixed opto-electrical device according to the invention comprising two photosensitive arrays.

As a first example of a configuration shown in FIG. 10, the fixed electro-optical device DEO comprises a point source S, two sensors CM1 and CM2 and two blades m and m' parallel with one another and each disposed at 45 degrees to the perpendiculars to the photosensitive surfaces of the sensors CM1 and CM2. In this configuration, the recording planes are parallel with one another.

Figure 11:
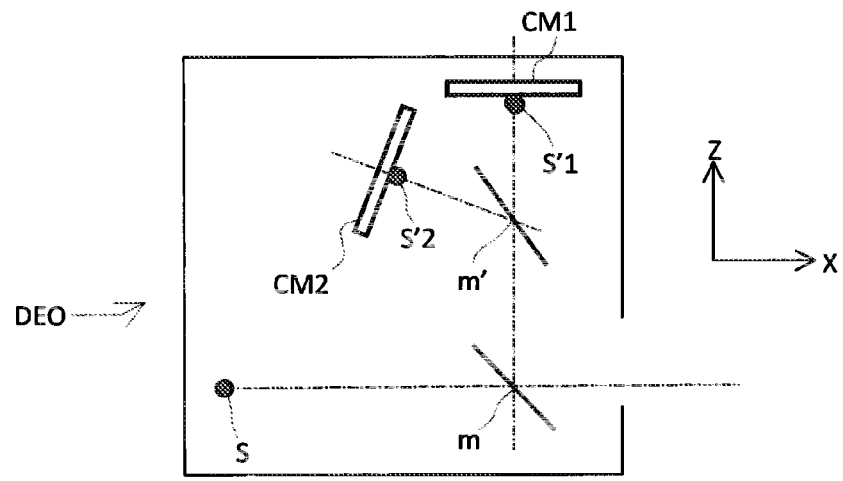
FIG. 11 shows a second embodiment of a fixed opto-electrical device according to the invention comprising two photosensitive arrays.

As a second example of a configuration shown in FIG. 11, the fixed electro-optical device DEO comprises a point source S, two array sensors CM1 and CM2 and two blades m and m' forming an angle between one other, inclined on the transmission axis of the source and the perpendiculars to the photosensitive surfaces of the sensors CM1 and CM2. In this configuration, the recording planes form an angle between one another, in this case, the images S'1 and S'2 of the source S can be disposed in the vicinity of the sensors CM1 and CM2.

Figure 12:
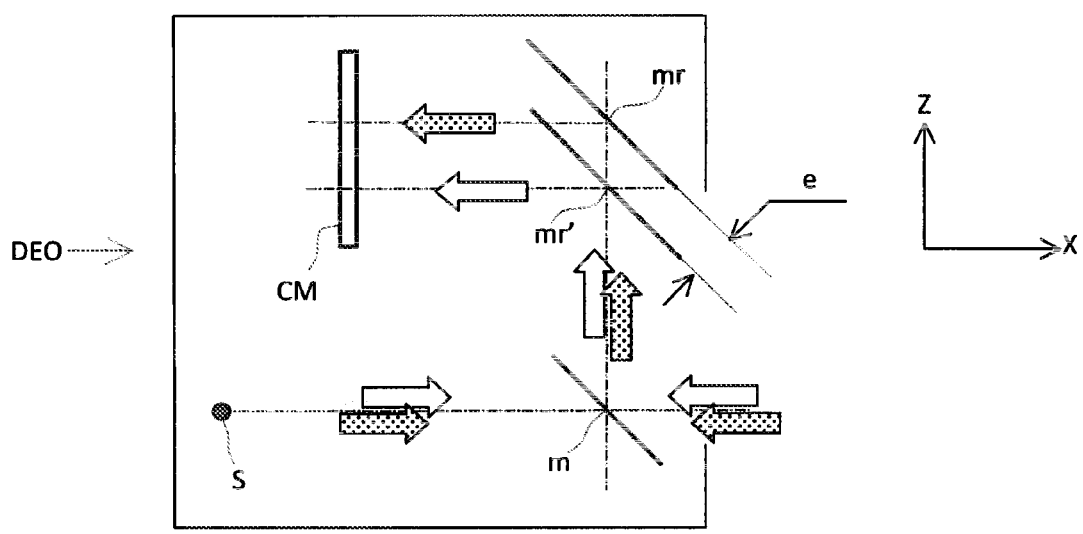
FIG. 12 shows a third embodiment of a fixed opto-electrical device according to the invention comprising one photosensitive array.
Figure 13:
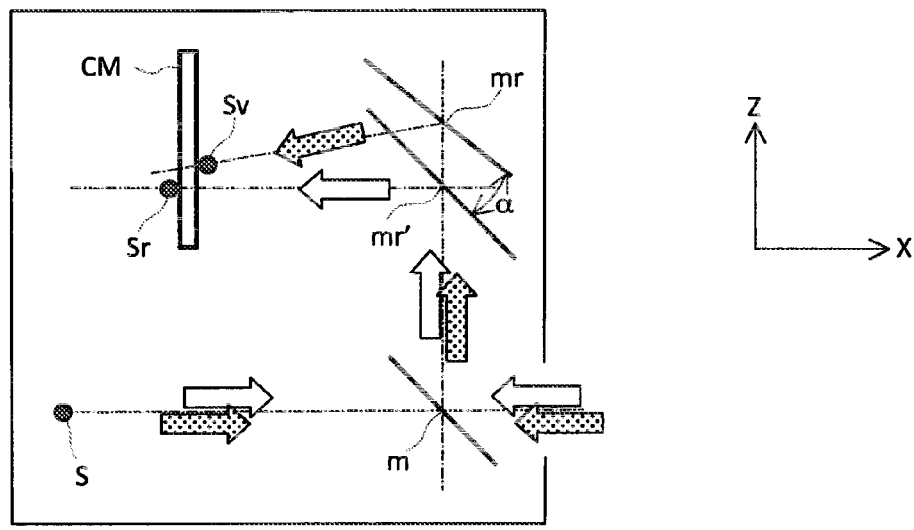
FIG. 13 shows a fourth embodiment of a fixed electro-optical device according to the invention comprising one photosensitive array.

A single sensor CM can be used to carry out the recording of the images. This configuration is shown in FIGS. 12 and 13. In this case, a spatial separation of the two recording planes is no longer used, but rather a spectral separation. The point source S is of the wide spectral band type or two spectral bands type which will be referred to as "red" and "green" to make a distinction between them. These spectral bands may be located, for example, in the visible or infrared spectrum. They are represented by a white arrow and a grey arrow in FIGS. 12 and 13. The array detector CM is then a single detector, but of the colour mosaic type, a colour filter being disposed on each pixel.

A spectrally selective mirror mr' is placed at 45° in front of the detector CM. It reflects, for example, the "red" band only. The "green" band is reflected by a conventional second mirror mr, parallel with the mirror mr' and positioned at a distance e from the mirror mr'. The position of the projection plane of the "green" image is therefore displaced according to the x axis by the distance dx equal to $\sqrt{2}e$. The position of the "green" image on this plane is also offset by the distance dz equal to $e/\sqrt{2}$. The displacement dx corresponds to the required effect, the displacement dz is an effect which is unwanted but which is easy to take into account in the vanishing point calculations.

FIG. 13 shows a variant of the preceding configuration intended to minimise the size of the sensor CM for all of the two channels. The mirrors mr and mr are positioned and oriented in such a way that the two points Sr and Sv, images of S produced by the association of the mirrors (m, mr) and (m, mr') respectively, are preferably located close to the centre of the CM and on either side of the photosensitive plane of the CM.

Figure 14:
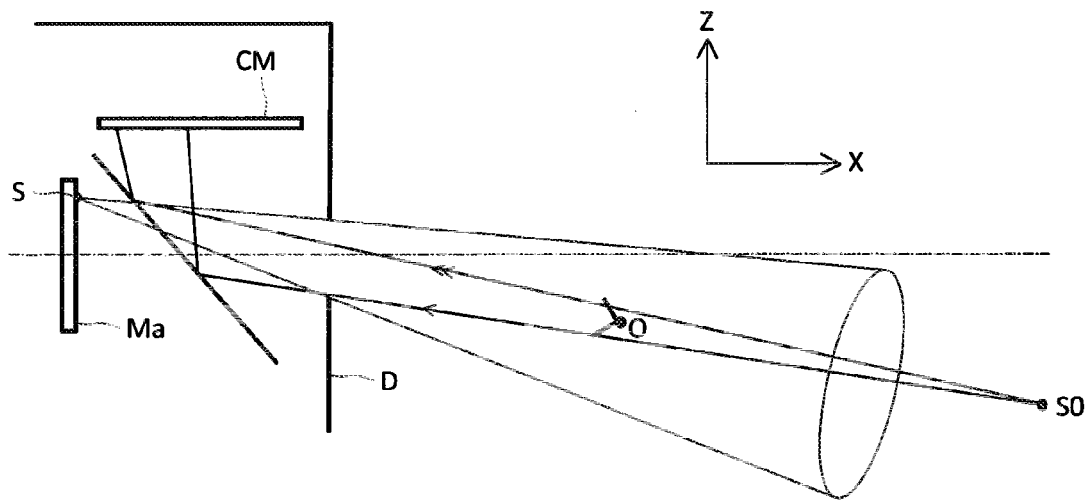
FIG. 14 shows a fixed electro-optical device according to the invention with an array of light sources.

In FIG. 14, the desired objective is twofold:

To restrict the radiation of the source S to the portion of the space containing the instantaneous position of the reflector;

To limit the angular receive field in order to reduce the influence of the luminous environment on the sensor.

In a certain number of applications and, in particular, for detecting the position and orientation of the aircraft helmet where the helmet is disposed in a transparent glass casing, the electro-optical device must be as resistant as possible to parasitic solar illumination and must radiate a minimum of flux to the outside and to the inside of the cabin.

One solution for reducing sensitivity to solar illumination and reducing the luminous flux is shown in FIG. 14. This FIG. 14 is simplified. To avoid overloading it, the image duplication device is not shown. A diaphragm D is disposed in front of the source to reduce the instantaneous angular extent of the radiation of the source. If these conditions were left as such, the source could only cover a rather small portion of space, limited by its angular extent. The source is also replaced by an array Ma of point sources, for example comprising electroluminescent diodes. At a given time, a single source of the array is illuminated. The position of the illuminated source is controlled by a simple automatic operation which re-centres the image of S as a quadrilateral on the sensor CM. The origin of the ambient radiation received by the sensor is also reduced to the portion of the space containing the reflector thanks to the presence of the diaphragm D fixed on the receive channel. The constraint on the minimum dimension of the sensor is increased by the dimensions of the array Ma of sources. An array filter, for example in the form of a sieve, can be interposed in front of the array of sources to reduce the effective dimension of each source by making it a point source.

Figure 15:
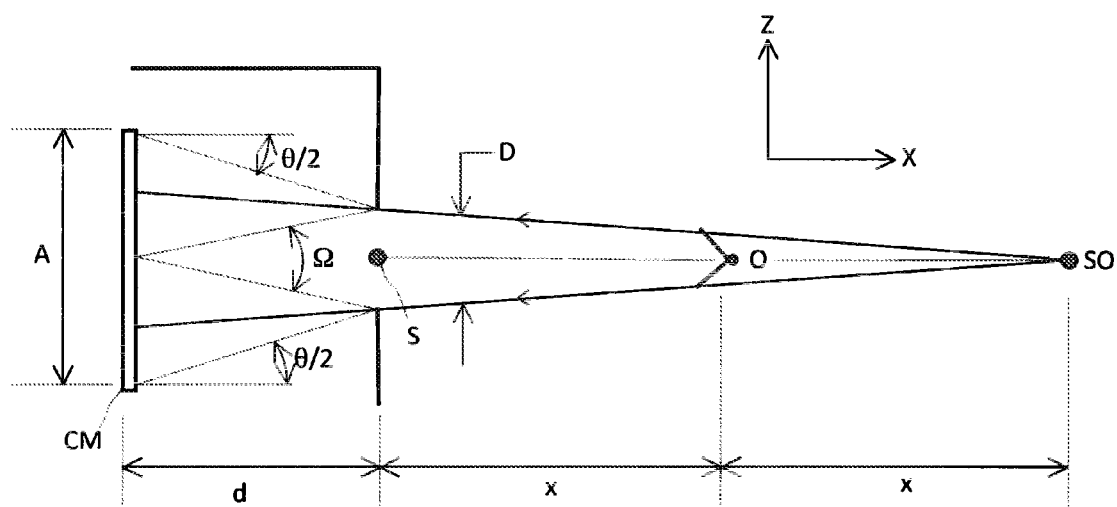
FIG. 15 shows a fixed electro-optical device according to the invention which is resistant to parasitic light.

FIG. 15 shows a second solution for reducing sensitivity to solar illumination. This FIG. 15 is simplified. To avoid overloading it, the image duplication device is not shown. In this configuration, the main characteristic of the cube corner reflector is then exploited, i.e. regardless of the orientation and position of the reflector, the reflected luminous flux remains approximately centred on the source S and the cross-sectional dimension of this flux in S remains at most equal to double the size of the mask. The centres of the detectors CM are no longer positioned close to the source S or its image produced by a deflecting mirror, but are longitudinally offset behind a diaphragm with a diameter D centred on the source S and correctly calibrated. Without notably degrading the illumination Es produced on the detector, this configuration substantially reduces the parasitic illumination Ep produced on the detector by the ambient luminous environment, at the cost of a reduction in the range of possible positions of the reflector and to the detriment of the compactness of the electro-optical device. The detector-source distance is denoted d and the reflector-source distance x.

To avoid masking the reflected flux originating from the virtual source S0, the diameter D of the diaphragm is at least equal to double the dimension of the mask of the reflector with the vertex O. The distancing of the detector modifies its illumination Es due to the source by the simple factor $(2x)2/(d+2x)^2$. The correction factor to be applied to the parasitic illumination Ep produced on the detector by the ambient luminous environment is approximated as follows. The parasitic illumination Ep initially received at a solid angle $2\pi$, is currently received at a solid angle $\Omega$ given by:

$$\Omega \approx \pi D^2/4d^2, \text{ for } d \gg 0.$$

The correction factor for Ep is therefore approximately $\Omega/2\pi = D^2/8d^2$.

The correction factor for the signal-to-noise ratio Es/Ep is therefore:

$$G = 8\{2dx/[D(d+2x)]\}^2$$

For $d \ll 2x$, $G \approx 8(d/D)^2$ is obtained; for $d \gg 2x$, the following is obtained:

$$G \approx 8(2x/D)^2; \text{ for } d \approx 2x, G \approx 8(d/2D)^2 \text{ is obtained.}$$

The range of possible positions of the reflector is currently restricted by the dimension of the sensor CCD. For a sensor with a cross-sectional dimension A, the angular field $\theta$ is given by:

$$D + \theta d \approx A, \text{ or } \theta \approx (A-D)/d.$$

The advantages of the optical orientation and position measuring system according to the invention are as follows:
  Insensitivity to solar illumination, a particularly crucial aspect for helmet position detection applications;
  precision independent from the translation movements of the helmet due to the wide depth of field;
  compactness of the fixed elements and mobile elements. These aspects are again particularly advantageous for helmet position detection where size and weight are decisive criteria.

The compactness is essentially due to the absence of image-forming lenses and illumination collimators and to the reduced dimension of the image sensors, the minimum of which is not less than twice the size of the cube corner mask. The position of the object is obtained by using only a single reflector on the helmet.

The precision is due to the absence of image focusing. The quality of the measurement and the dimension of the image are totally insensitive to the position of the reflector. The absence of an optical image-forming lens with a necessarily limited angular field enables a very wide range of positions of the object.

What is claimed is:

1. System for detecting the position of a mobile object in space, comprising a fixed electro-optical device of known orientation, comprising at least a first transmission point source, image analysis means and a unit comprising an optical cube corner disposed on the mobile object, wherein:
  the input surface of the cube corner comprises a polygonal-shaped mask, each side of the polygon comprising a geometric marking to identify it, the image of the mask obtained by reflection on the surfaces of the cube corner being the intersection of the projection of the mask and the projection of its image by the cube corner in relation to the center of the cube corner;
  the fixed electro-optical device comprises optical means for implementing a luminous shape in perspective in a first recording plane and a second luminous shape in perspective in a second recording plane optically offset from the first recording plane, photosensitive means being disposed in said recording planes; and
  the image analysis means comprising means for determining the two first vanishing points of the first luminous shape in the first recording plane and the two second vanishing points of the second luminous shape in the second recording plane, the knowledge of said four vanishing points enabling the position and orientation of the optical cube corner in relation to the fixed electro-optical device to be determined.

2. Detection system according to claim 1, wherein the fixed electro-optical device comprises only optical components having a zero or quasi-zero optical power, i.e. plane mirrors or semi-reflective planar blades, the separation between the transmission point source and the first and second luminous form being implemented by means of a semi-reflective planar blade.

3. Detection system according to claim 1, wherein the first recording plane is parallel with the second recording plane and offset by a predetermined distance.

4. Detection system according to claim 1, wherein the first recording plane is tilted in relation to the second recording plane at a predetermined angle.

5. Detection system according to claim 1, wherein the first recording plane is separated from the second recording plane by means of a spectrally neutral semi-reflective blade, the photosensitive means being two different array sensors.

6. Detection system according to claim 1, wherein the first recording plane is separated from the second recording plane by means of a unit comprising a first dichroic blade and a mirror disposed in such a way as to reflect two different spectral bands, the photosensitive means being one and the same array sensor, the transmission point source transmitting in the two spectral bands.

7. Detection system according to, wherein the fixed electro-optical device comprises an array of transmission point sources, said sources being illuminated according to the position of the mobile object.

8. Detection system according to claim 1, wherein the input surface of the cube corner comprises a parallelogram-shaped mask.

9. Detection system according claim 1, wherein the fixed electro-optical device comprises an input diaphragm, the transmission point source or its image being disposed in the vicinity of this diaphragm, the photosensitive means being set back from this diaphragm in such a way as to limit external parasitic illumination.

10. Pilot's helmet comprising an optical cube corner, the input surface of which comprises a parallelogram-shaped mask, each side of the parallelogram comprising a geometric marking to identify it, said cube corner being intended to operate in a system for detecting the orientation and the position of a mobile object in space, comprising a fixed electro-optical device of known orientation, comprising at least a first transmission point source, image analysis means and a unit comprising an optical cube corner disposed on the mobile object, wherein:

the input surface of the cube corner comprises a polygonal-shaped mask, each side of the polygon comprising a geometric marking to identify it, the image of the mask obtained by reflection on the surfaces of the cube corner being the intersection of the projection of the mask and the protection of its image by the cube corner in relation to the center of the cube corner;

the fixed electro-optical device comprises optical means for implementing a luminous shape in perspective in a first recording plane and a second luminous shape in perspective in a second recording plane optically offset from the first recording plane, photosensitive means being disposed in said record planes; and the image analysis means comprising means for determining the two first vanishing points of the first luminous shape in the first recording plane and the two second vanishing points of the second luminous shape in the second recording plane, the knowledge of said four vanishing points enabling the position and orientation of the optical cube corner in relation to the fixed electro-optical device to be determined.

\* \* \* \* \*